(12) United States Patent
Misawa et al.

(10) Patent No.: US 11,095,824 B2
(45) Date of Patent: Aug. 17, 2021

(54) IMAGING APPARATUS, AND CONTROL METHOD AND CONTROL PROGRAM THEREFOR

(71) Applicant: FUJIFILM Corporation, Tokyo (JP)

(72) Inventors: Takeshi Misawa, Saitama (JP); Michio Cho, Saitama (JP); Shigeru Kondou, Saitama (JP); Atsushi Misawa, Saitama (JP); Shunsuke Miyagishima, Saitama (JP); Nanae Sakuma, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/833,078

(22) Filed: Mar. 27, 2020

(65) Prior Publication Data
US 2020/0228726 A1    Jul. 16, 2020

Related U.S. Application Data

(63) Continuation of application No. PCT/JP2018/035884, filed on Sep. 27, 2018.

(30) Foreign Application Priority Data

Sep. 28, 2017  (JP) .............................. JP2017-188042

(51) Int. Cl.
*H04N 5/232* (2006.01)

(52) U.S. Cl.
CPC ... *H04N 5/232939* (2018.08); *H04N 5/23218* (2018.08); *H04N 5/23296* (2013.01)

(58) Field of Classification Search
CPC ......... H04N 5/232939; H04N 5/23296; H04N 5/23218
See application file for complete search history.

(56) References Cited

U.S. PATENT DOCUMENTS

2009/0096879 A1* 4/2009 Motomura ......... H04N 5/23248
                                              348/208.6
2012/0026346 A1* 2/2012 Lee .................... H04N 5/23218
                                              348/208.1

FOREIGN PATENT DOCUMENTS

| JP | 7-107369 A      | 4/1995 |
| JP | 2004-221650 A   | 8/2004 |
| JP | 2009-105825 A   | 5/2009 |
| JP | 2010-16669 A    | 1/2010 |
| WO | WO 2008/114499 A1 | 9/2008 |

OTHER PUBLICATIONS

International Search Report for PCT/JP2018/035884 (PCT/ISA/210) dated Nov. 27, 2018.
Toyohiko Hatada, "Artificial reality and visual space perception", Japan Ergon Soc vol. 29. No. 3, (1993), pp. 129-134.
Written Opinion of the International Searching Authority for PCT/JP2018/035884 (PCT/ISA/237) dated Nov. 27, 2018.

* cited by examiner

*Primary Examiner* — Ahmed A Berhan
(74) *Attorney, Agent, or Firm* — Birch, Stewart, Kolasch & Birch, LLP

(57) ABSTRACT

A finder display unit displays a live view image based on a captured image generated by an imaging unit. A digital signal processing unit detects a movement vector between frames in the live view image for a predetermined portion in the captured image. A digital signal processing unit changes a display range of the live view image on the finder display unit based on the detected movement vector of a peripheral portion in the captured image.

10 Claims, 13 Drawing Sheets

FIG. 7
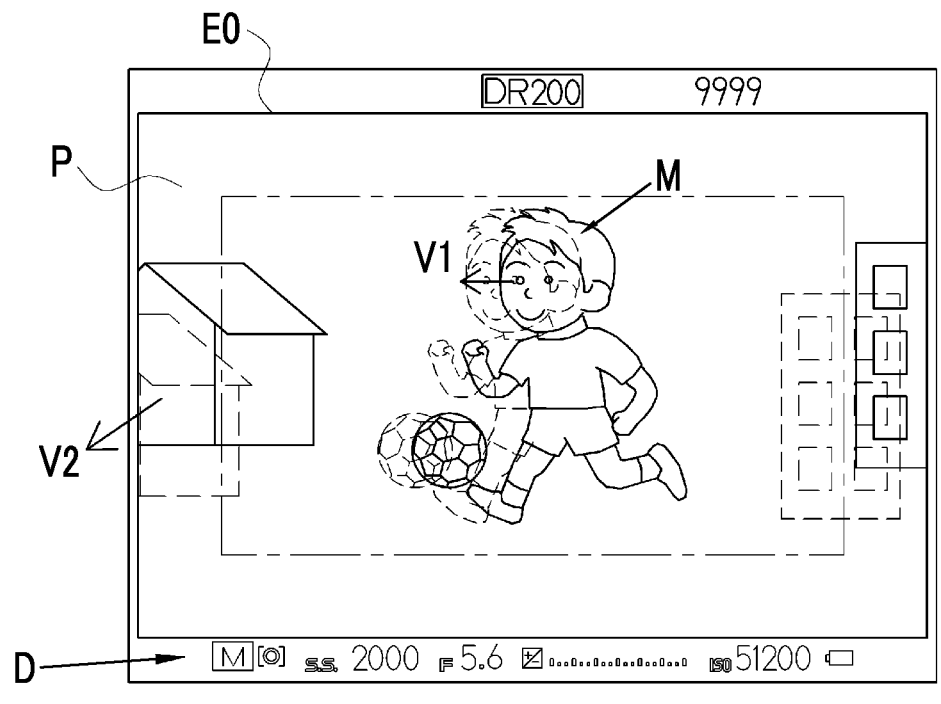
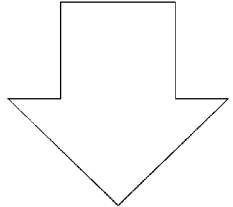
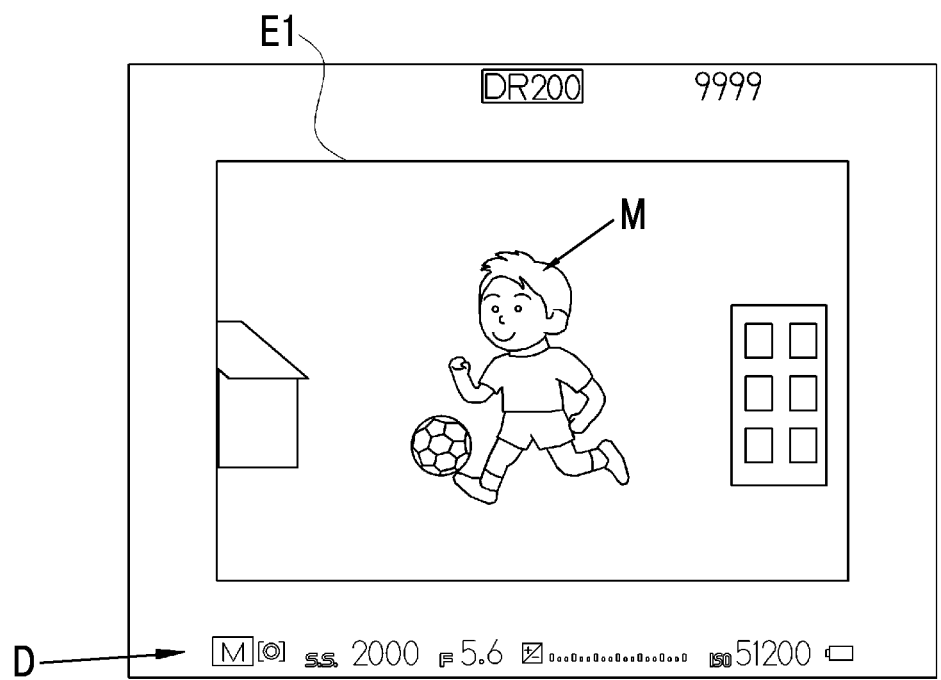

FIG. 8
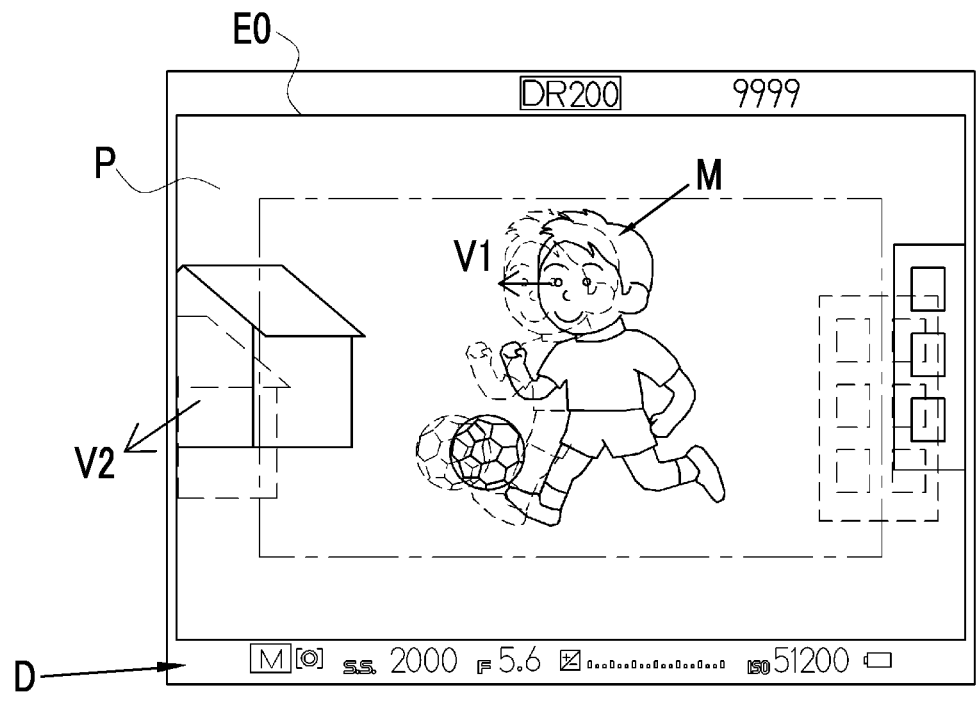
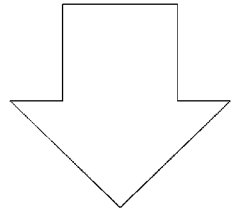
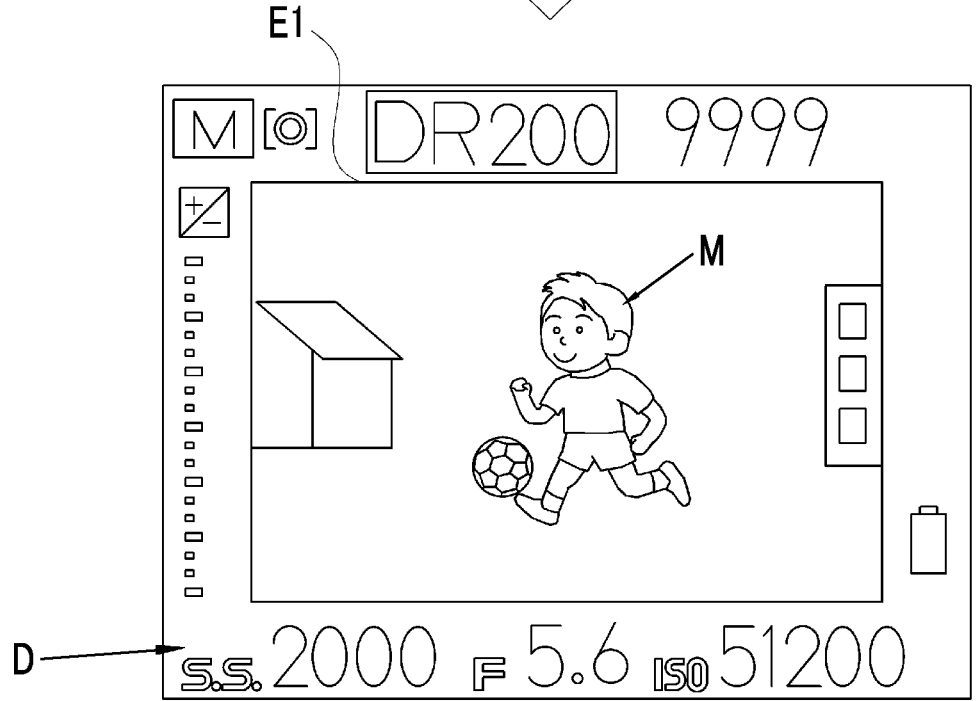

FIG. 12
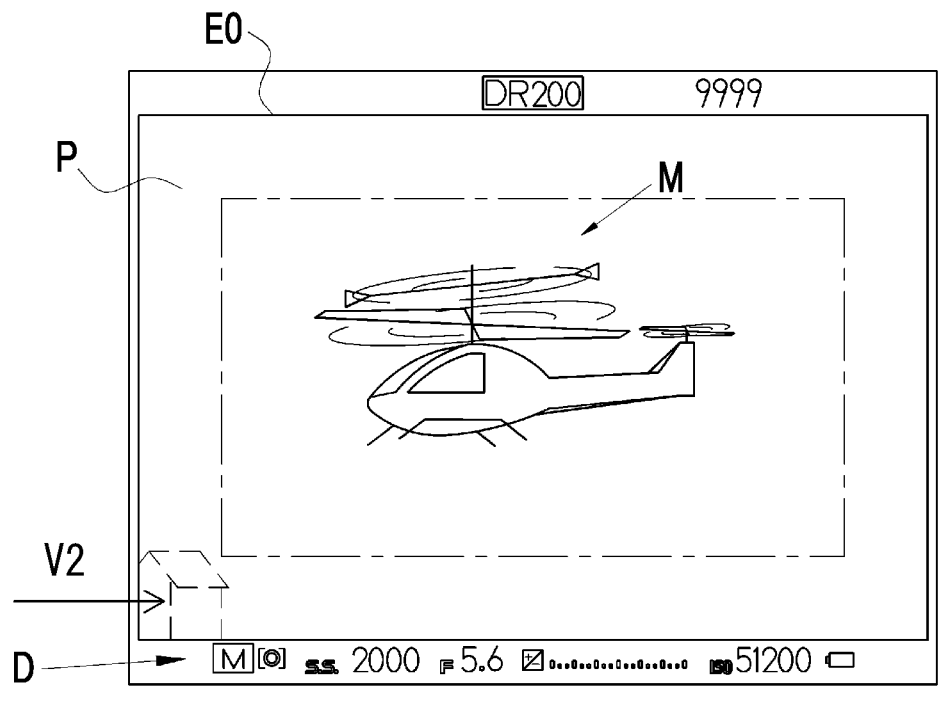
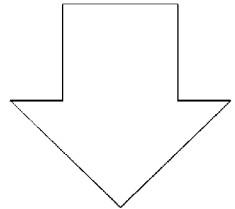
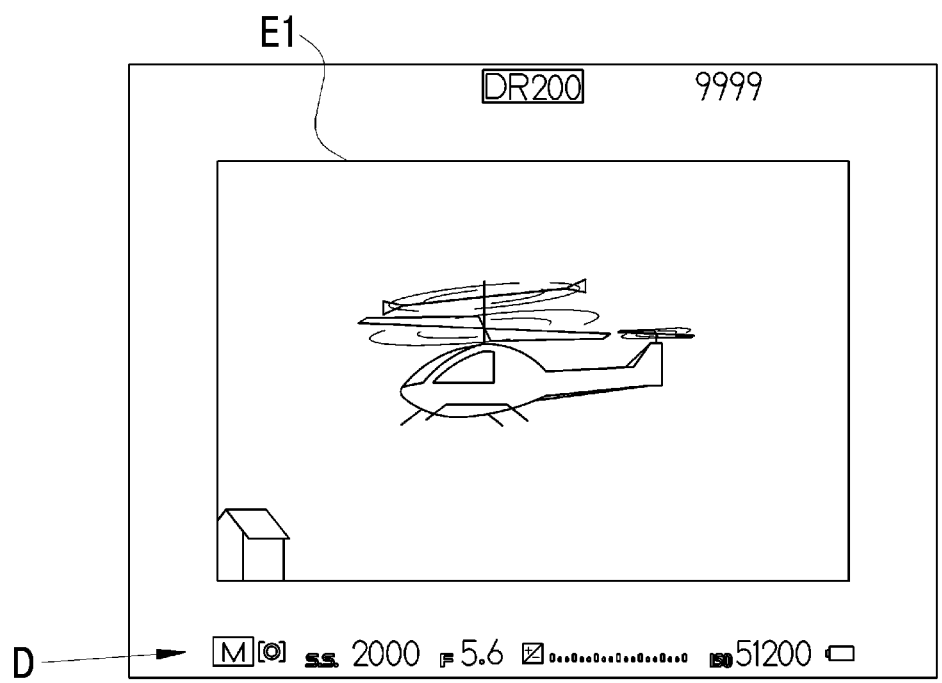

IMAGING APPARATUS, AND CONTROL METHOD AND CONTROL PROGRAM THEREFOR

CROSS-REFERENCE TO RELATED APPLICATIONS

This application is a Continuation of PCT International Application No. PCT/JP2018/035884 filed on 27 Sep. 2018, which claims priority under 35 U.S.C § 119(a) to Japanese Patent Application No. 2017-188042 filed on 28 Sep. 2017. The above application is hereby expressly incorporated by reference, in its entirety, into the present application.

BACKGROUND OF THE INVENTION

1. Field of the Invention

The present invention relates to an imaging apparatus, and a control method and a control program therefor.

2. Description of the Related Art

In general, an imaging apparatus, such as a digital camera, comprises a finder unit that allows a photographer to look through an eyepiece window to confirm the subject image, in addition to a rear display unit provided on a rear surface of the camera body. As the finder unit, an electronic view finder in which a live view image is displayed on a finder display unit disposed at the back of an eyepiece optical system is known.

Since such an electronic view finder observes the live view image magnified by the eyepiece optical system, visibility depends on characteristics of human eyes. Among the characteristics of the human eyes, the property of a visual field is classified into five kinds (see "Toyohiko HATADA (1993) Artificial reality and visual space perception, JAPAN Ergon Soc Vol. 29, No 3, p. 129-134").

(1) discriminative visual field: a range in which visual functions, such as vision and color discrimination, are excellent and information with high accuracy can be received (within several °)

(2) effective visual field: a range in which information is gazed only with eye movement and specific information can be received from the inside of noise instantly (within about 15° right-leftward, about 8° upward, about 12° downward)

(3) gaze-stabilized visual field: a range in which head movement occurs in a state of supporting eye movement and gaze is possible reasonably (within 30 to 45° right-leftward, 20 to 30° upward, and 25 to 40° downward)

(4) guiding visual field: a range in which only identification capability to such an extent that the presence of presented information can be determined is provided, but a human sense of space coordinates is affected (within 30 to 100° horizontal and 20 to 85° vertical)

(5) auxiliary visual field: a range in which information reception extremely decreases and auxiliary work is performed to such an extent that a gaze operation is induced with a strong stimulus or the like (within 100 to 200° horizontal and 85 to 135° vertical)

In recent years, a digital camera comprising an electronic view finder has been increased. Accordingly, an imaging apparatus that can change a viewing angle of the electronic view finder based on a setting input of a photographer in order to capture an image with higher quality is known (JP2010-016669A). In such an imaging apparatus, in a case where the viewing angle of the electronic view finder is expanded, a live view image is expanded fully inside the eyepiece window, through which the photographer looks, and a sense of presence is provided. Then, it is possible to obtain a captured image with high quality based on the live view image with a sense of presence. In a case where the photographer looks into the electronic view finder, an angle of the head with respect to the imaging apparatus is fixed. For this reason, while a target is hardly captured in an area where the angle exceeds 30° in a horizontal direction, as the live view image is displayed in an area (the above-described guiding visual field) exceeding the area, a sense of presence is provided.

SUMMARY OF THE INVENTION

However, in the imaging apparatus described in JP2010-016669A described above, in a case where the setting input is performed so as to expand the viewing angle of the electronic view finder, it is advantageous in that a sense of presence is provided in the live view image; however, as described above, it is known that a viewing angle at which a human can gaze is limited. Accordingly, in a case where the photographer gazes a principal subject, there is a concern that an outside of the viewing angle at which the photographer can gaze, that is, a peripheral portion within the live view image is overlooked in exchange therefor.

In a case where there is movement in the peripheral portion within the live view image, for example, when the photographer performs a pan operation or a tilt operation following the principal subject, when a moving object enters, or the like, even though an unnecessary object for the photographer is present in the peripheral portion of the live view image, the photographer may perform imaging without noticing the unnecessary object. Alternatively, while it is considered that an object, which may become a new principal subject for the photographer, is present in the peripheral portion of the live view image, the photographer may gaze and image only the original principal subject without noticing the object.

On the other hand, in the imaging apparatus described in JP2010-016669A, in a case where the viewing angle of the electronic view finder is narrowed, the photographer can notice a situation of the peripheral portion, an object, which enters the peripheral portion, or the like in a case where there is movement in the peripheral portion within the live view image. Instead, imaging cannot be performed to provide a sense of presence.

An object of the invention is to provide an imaging apparatus capable of providing a sense of presence in a live view image and allowing a photographer to notice movement in a peripheral portion within the live view image, and a control method and a control program therefor.

In order to achieve the above-described object, the invention provides an imaging apparatus comprising an imaging unit, a finder display unit, a movement vector detection unit, and a display range change unit. The imaging unit images a subject to generate a captured image. The finder display unit displays a live view image based on the captured image generated by the imaging unit. The movement vector detection unit detects a movement vector between frames in the captured image or the live view image for a predetermined portion in the captured image. The display range change unit changes a display range of the live view image on the finder display unit based on the movement vector of a peripheral portion in the captured image detected by the movement vector detection unit.

It is preferable that the imaging apparatus further comprises a principal subject image recognition unit that recognizes a principal subject image present in the captured image, the movement vector detection unit detects the movement vector of the principal subject image in a case where the principal subject image is recognized by the principal subject image recognition unit, and the display range change unit compares an amount of movement based on the movement vector of the peripheral portion with an amount of movement based on the movement vector of the principal subject image and reduces the display range in a case where the amount of movement based on the movement vector of the peripheral portion is greater than the amount of movement based on the movement vector of the principal subject image.

It is preferable that the display range change unit reduces the display range in a case where an amount of movement based on the movement vector of the peripheral portion is equal to or greater than a predetermined value.

It is preferable that the imaging apparatus further comprises a speed detection unit that detects a speed of a pan operation or a tilt operation, and the display range change unit changes a reduction rate of the display range according to the speed detected by the speed detection unit.

It is preferable that the imaging apparatus further comprises a display control unit that makes imaging information relating to an imaging content of the imaging unit be displayed around the display range on the finder display unit, and in a case where the display range change unit reduces the display range, the display control unit makes the imaging information be displayed on a magnified scale compared to before the reduction of the display range.

It is preferable that the imaging apparatus further comprises a speed detection unit that detects a speed of a pan operation or a tilt operation, the display range change unit changes a reduction rate of the display range according to the speed detected by the speed detection unit, and the display control unit changes a magnification rate of the imaging information according to the speed.

It is preferable that the imaging unit comprises an optical system that is able to change an angle of view, and the display range change unit changes a reduction rate of the display range according to the angle of view.

It is preferable that a reduction rate of the display range is changed according to a portion in the peripheral portion where the movement vector is detected.

The invention also provides a control method for an imaging apparatus comprising an imaging unit and a finder display unit. The control method comprises a step of detecting a movement vector between frames in the captured image or the live view image for a peripheral portion in the captured image, and a step of changing a display range of the live view image on the finder display unit based on the movement vector of the peripheral portion detected by the movement vector detection unit.

The invention also provides a control program for an imaging apparatus comprising an imaging unit and a finder display unit. The control program causes the imaging apparatus to execute a step of detecting a movement vector between frames in the captured image or the live view image for a peripheral portion in the captured image, and a step of changing a display range of the live view image on the finder display unit based on the movement vector of the peripheral portion detected by the movement vector detection unit.

According to the invention, it is possible to provide a sense of presence in a live view image, and to allow a photographer to notice movement in a peripheral portion within the live view image.

BRIEF DESCRIPTION OF THE DRAWINGS

FIG. 7 is an example of a display screen of the live view image and is an explanatory view showing before and after change in a case of reducing a display range of the live view image.

FIG. 8 is an explanatory view showing before and after change in a case of reducing the display range of the live view image and displaying imaging information on a magnified scale in a second embodiment.

FIG. 12 is an example of a display screen of the live view image in the fourth embodiment and is an explanatory view showing before and after change in a case of reducing a display range of the live view image.

DESCRIPTION OF THE PREFERRED EMBODIMENTS

First Embodiment

Figure 1:
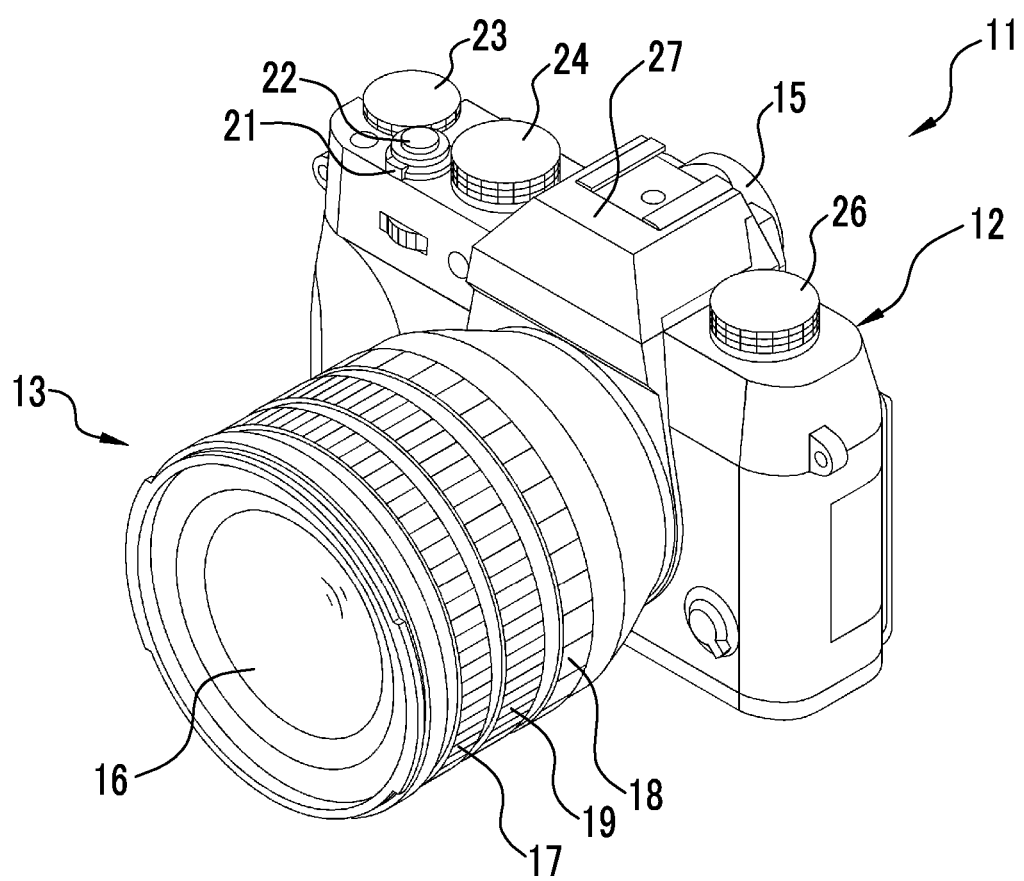
FIG. 1 is a perspective view showing an appearance of a digital camera from a front surface side.
Figure 2:
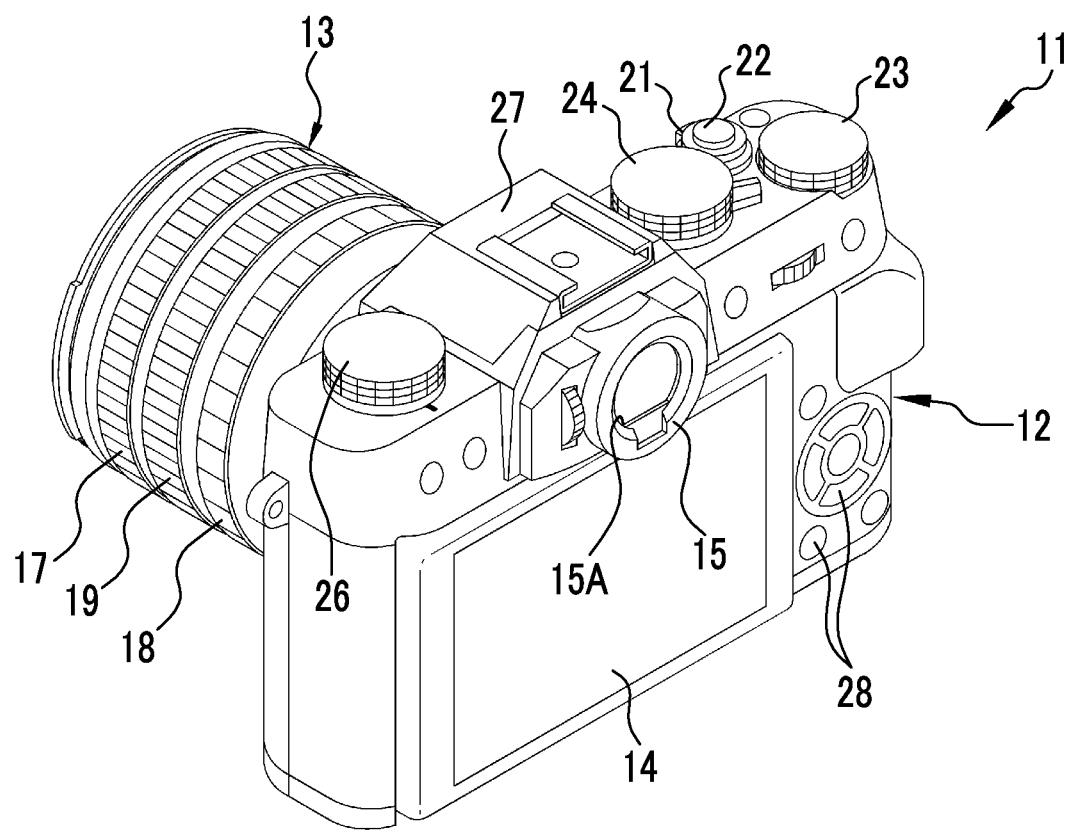
FIG. 2 is a perspective view showing the appearance of the digital camera from a rear surface side.

In FIGS. 1 and 2, a digital camera 11 comprises a camera body 12 (apparatus body), a lens barrel 13, a rear display unit 14, and a finder unit 15.

The lens barrel 13 is provided on a front surface of the camera body 12, and holds an imaging optical system 16. A focus ring 17, a stop ring 18, and a zoom ring 19 are provided on an outer periphery of the lens barrel 13.

The rear display unit 14 is provided on a rear surface of the camera body 12 and is used for playback of a captured image, display of a live view image, display of a setting menu, and the like. The rear display unit 14 is constituted of, for example, an LCD panel. A touch panel 29 (see FIG. 3) is attached to a surface of the rear display unit 14, and an input instruction from the touch panel 29 is transmitted to a main control unit 41.

A power lever 21, a release switch 22, an exposure correction dial 23, a shutter speed dial 24, an ISO sensitivity dial 26, an internal flash device 27, and the like are provided on an upper surface of the camera body 12. A plurality of operation buttons 28 are provided on the rear surface of the camera body 12. A plurality of operation buttons 28 are used for various setting operations and the like.

The digital camera 11 can switch an operation mode among imaging mode (static image or video imaging mode), a playback mode, and a setting mode through an operation of the operation buttons 28.

The power lever 21 is operated in turning on or off a power source (not shown) of the digital camera 11. The release switch 22 is operated in performing imaging. The shutter speed dial 24 is operated in switching a shutter speed of the digital camera 11.

The release switch 22 a two-stage stroke type switch (not shown) constituted of an S1 switch and an S2 switch. The digital camera 11 performs an imaging preparation operation, such as automatic exposure adjustment, in a case where the release switch 22 is depressed (half depression) and the S1 switch is brought into an on state. In a case where the release switch 22 is further depressed (full depression) from this state and the S2 switch is brought into an on state, an imaging operation is performed.

In a bottom portion of the camera body 12, a slot (not shown) for mounting a recording medium 52 (see FIG. 3) described below and a loading lid (not shown) for opening and closing an aperture of the slot are provided.

The finder unit 15 is an electronic view finder, and a live view image described below is displayed on a finder display unit 31 (see FIG. 3) constituted of an LCD disposed at the back of a finder eyepiece window 15A. An eye of a photographer contacts the finder eyepiece window 15A disposed on the rear surface side of the camera body 12.

Figure 3:
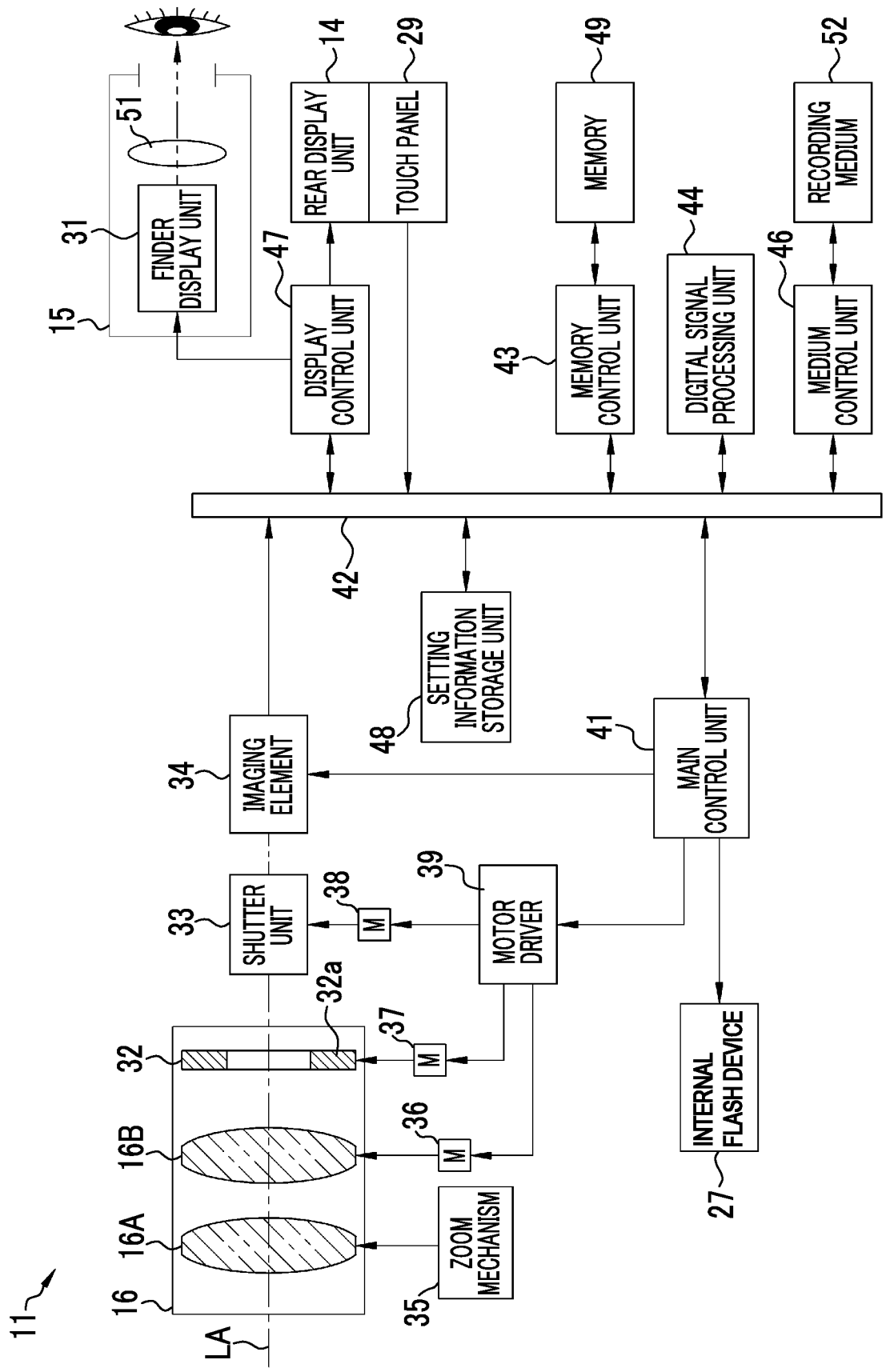
FIG. 3 is a block diagram showing the configuration of the digital camera.

In FIG. 3, the imaging optical system 16 comprises a plurality of lenses including a variable magnification lens 16A and a focus lens 16B, a stop unit 32, and the like. A shutter unit 33 and an imaging element 34 are disposed behind the imaging optical system 16 along an optical axis LA of the imaging optical system 16. The imaging element 34 is provided inside the camera body 12.

A zoom mechanism 35 is a manual zoom mechanism that converts a rotation operation of the zoom ring 19 to a linear movement to move the variable magnification lens 16A. The variable magnification lens 16A is moved in a direction of the optical axis LA with driving of the zoom mechanism 35 and changes an angle of view of the imaging optical system 16.

The focus lens 16B is moved in the direction of the optical axis LA with driving of a motor 36 and adjusts an imaging distance. The main control unit 41 transmits a control signal for moving the focus lens 16B to a motor driver 39 according to a rotation direction and an amount of rotation of the focus ring 17 detected based on a signal of a detection unit (not shown). The motor driver 39 drives the motor 36 based on the control signal.

The stop unit 32 moves a plurality of stop leaf blades 32a with driving of a motor 37 and changes an amount of light incident on the imaging element 34. The optical image of the subject that is transmitted through the imaging optical system 16 and has an amount of light adjusted by a stop 30 is incident on the imaging element 34. The main control unit 41 transmits a control signal for moving the stop leaf blades 32a to the motor driver 39 according to an angle position of the stop ring 18 detected based on a signal of a detection unit (not shown). The motor driver 39 drives the motor 37 based on the control signal.

The shutter unit 33 is a mechanical shutter, such as a focal plane shutter, and is disposed between the stop unit 32 and the imaging element 34. The shutter unit 33 is provided to shut off an optical path between the imaging optical system 16 and the imaging element 34, and changes between an aperture open state and an aperture closed state.

The shutter unit 33 is brought into the aperture open state at the time of live view image and video capturing. The shutter unit 33 is temporarily brought into the aperture closed state from the aperture open state at the time of static image capturing. The shutter unit 33 is driven by a motor 38. The main control unit 41 transmits a control signal for operating the shutter unit 33 to the motor driver 39 according to setting information of a shutter system described below. The motor driver 39 drives the motor 38 based on the control signal.

The imaging element 34 is driven and controlled by the main control unit 41. The imaging element 34 constitutes an imaging unit along with the shutter unit 33, the digital signal processing unit 44, and the like. In a case of flash imaging using the internal flash device 27, the internal flash device 27 also constitutes the imaging unit. The imaging element 34 is, for example, a single-plate color imaging type CMOS image sensor having an RGB color filter. The imaging element 34 has a light receiving surface constituted of a plurality of pixels (not shown) arranged in a two-dimensional matrix. Each pixel includes a photoelectric conversion element, and captures the subject image formed on the light receiving surface by the imaging optical system 16 through photoelectric conversion to generate an imaging signal. The imaging element 34 has an electronic shutter function, and a shutter speed (electric charge accumulation time) thereof can be adjusted.

The imaging element 34 comprises signal processing circuits (all are not shown), such as a noise elimination circuit, an automatic gain controller, and an A/D conversion circuit. The noise elimination circuit executes noise elimination processing on the imaging signal. The automatic gain controller amplifies the level of the imaging signal to an optimum value. The A/D conversion circuit converts the imaging signal to a digital signal and outputs the digital signal from the imaging element 34. An output signal of the imaging element 34 is image data (so-called RAW data) having one pixel value for each pixel.

The imaging element 34 and the main control unit 41 are connected to a bus 42. In addition, a memory control unit 43, a digital signal processing unit 44, a medium control unit 46, a display control unit 47, a setting information storage unit 48, and a touch panel 29 are connected to the bus 42.

A memory 49 for temporary storage, such as an SDRAM, is connected to the memory control unit 43. The memory control unit 43 inputs and stores image data output from the imaging element 34 to the memory 49. The memory control unit 43 outputs image data stored in the memory 49 to the digital signal processing unit 44.

The finder unit 15 comprises a finder display unit 31 and an eyepiece optical system 51. An image displayed on the finder display unit 31 is magnified by the eyepiece optical system 51 and is observed by an eye of the photographer contacting the finder eyepiece window 15A.

In the digital camera 11, in a case where the imaging mode (static image or video imaging mode) is selected as the operation mode, captured images generated from the imaging unit cyclically (several tens of frames every second) are output to the finder display unit 31 or the rear display unit 14 through the display control unit 47 and are continuously displayed as a live view image (also referred to as a live preview image) for composition confirmation. The photographer adjusts an imaging direction or the angle of view of the imaging optical system 16 (the amount of movement of the variable magnification lens 16A) while viewing the live view image such that a desired composition is obtained and performs a release operation (a depression operation of the release switch 22) when the desired composition is obtained.

The digital signal processing unit 44 executes known image processing, such as matrix calculation, demosaic processing, y correction, brightness and color difference conversion, and resizing processing, on image data input from the memory 49, and generates captured image data based on the pixel value of each pixel. The digital signal processing unit 44 is constituted of a digital signal processor (DSP). The display control unit 47 controls image display on the rear display unit 14 and the finder display unit 31.

In the digital camera 11, in a case where the imaging mode (static image or video imaging mode) is selected as the operation mode, the digital signal processing unit 44 functions as a movement vector detection unit that detects a movement vector between frames in the live view image for a predetermined portion in the captured image. Specifically, the digital signal processing unit 44 calculates a movement vector for feature points of an i-th frame and an (i+1)th frame in the live view image based on the captured images generated from the imaging unit cyclically (several tens of frames every second). The movement vector indicates movement of a feature point similar to a feature point of a standard image (in this case, the i-th frame) to any place of an image of interest ((i+1)th frame) using a vector having components of an amount of movement and a movement direction.

In the embodiment, in a case of functioning as the movement vector detection unit, the digital signal processing unit 44 detects a movement vector of the principal subject image and a movement vector of a peripheral portion in the captured image. In a case of detecting the movement vector of the principal subject image, the digital signal processing unit 44 functions as a principal subject image recognition unit that first recognizes the principal subject image present in the captured image. In a case of functioning as the principal subject image recognition unit, the digital signal processing unit 44 recognizes the principal subject image present in the captured image using a known pattern matching method, a face detection method, or the like.

Figure 4:
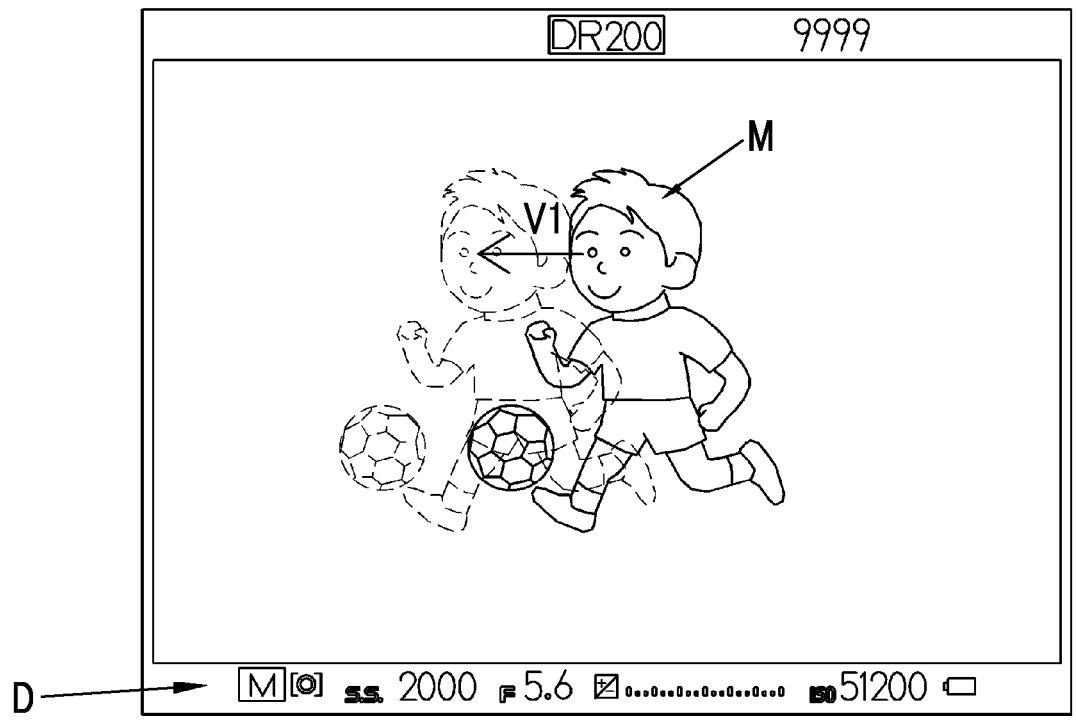
FIG. 4 is an explanatory view showing an example of a captured image that is displayed on a finder display unit.

As shown in FIG. 4, in a case where a principal subject image M is recognized, the digital signal processing unit 44 detects a movement vector V1 of the principal subject image M indicating movement from an i-th frame in a live view image to any place of an (i+1)th frame for a feature point set in advance in the recognized principal subject image M, for example, an eye portion.

Figure 5:
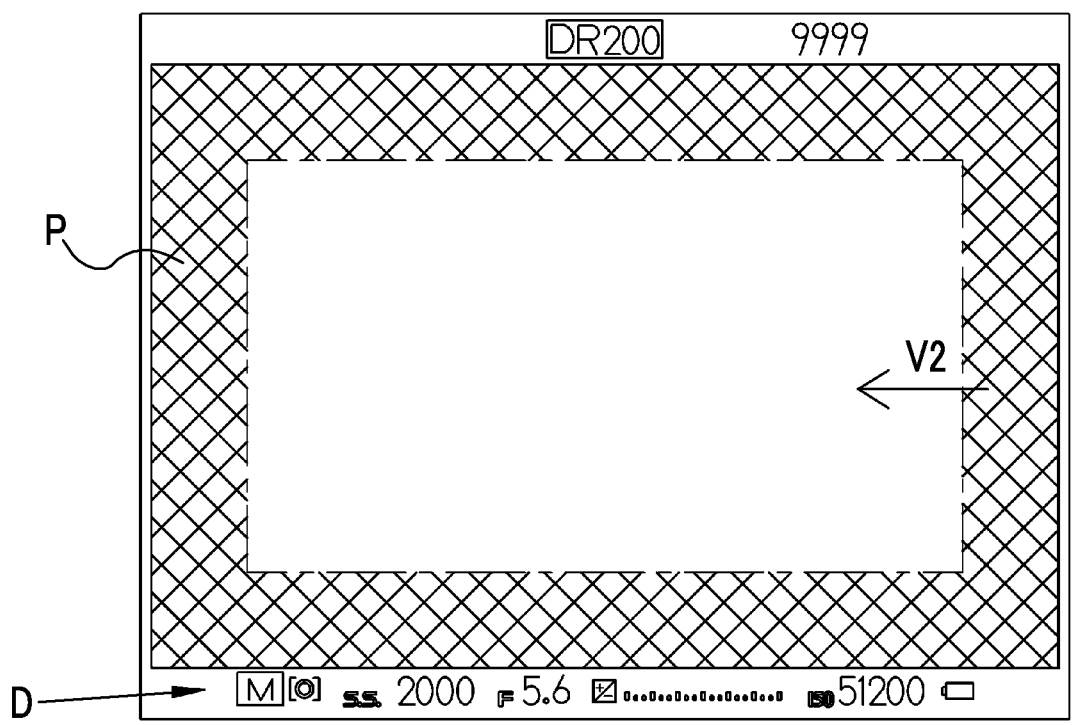
FIG. 5 is an explanatory view showing an example of a peripheral portion P in a captured image where a movement vector is detected.

As shown in FIG. 5, in a case of detecting a movement vector of the peripheral portion P (a meshed range in the drawing) in the captured image from the live view image, for example, the digital signal processing unit 44 detects a plurality of feature points in the peripheral portion in the captured image, calculates a movement vector indicating movement from the i-th frame to any place of the (i+1)th frame for each of a plurality of feature points, and detects an average value of the calculated movement vectors for a plurality of feature points as a movement vector V2 of the peripheral portion P. As a detection method of a plurality of feature points in the peripheral portion in the captured image, for example, a predetermined color, a gradation, a shape, or the like is detected as a feature point.

In regard to the peripheral portion P in the captured image where the digital signal processing unit 44 detects the movement vector, when a case where the live view image is displayed in a maximum display range displayable on the finder display unit 31, that is, a case where the live view image is displayed to be largest inside the finder eyepiece window 15A, into which the photographer looks, is defined as a standard, the outside of a viewing angle, at which a human can gaze the live view image, is set as the peripheral portion P.

The digital signal processing unit 44 also functions as a display range change unit that changes a display range of the live view image on the finder display unit 31 based on the movement vector of the peripheral portion P detected in a case of functioning as the movement vector detection unit. In the embodiment, the digital signal processing unit 44 compares an amount of movement based on the movement vector V2 of the peripheral portion P with an amount of movement based on the movement vector V1 of the principal subject image M, and in a case where the amount of movement based on the movement vector V2 of the peripheral portion P is greater than the amount of movement based on the movement vector V1 of the principal subject image M, performs control such that the display control unit 47 reduces the display range of the live view image on the finder display unit 31. In this case, the display range is reduced at a given reduction rate with respect to the maximum display range displayable on the finder display unit 31.

As described above, in a case where the digital signal processing unit 44 reduces the display range of the live view image on the finder display unit 31, a state in which the display range is reduced may be maintained while the imaging mode is continued. In a case where a predetermined time has elapsed after the display range is reduced, a display range of an initial setting, for example, the maximum display range displayable on the finder display unit 31 may be returned.

On the other hand, in a case where the amount of movement based on the movement vector V2 of the peripheral portion P is less than the amount of movement based on the movement vector V1 of the principal subject image M, the display range of the live view image on the finder display unit 31 is not changed, and the live view image is displayed in the display range of the initial setting.

The medium control unit 46 controls recording and reading of image files on and from the recording medium 52. The recording medium 52 is, for example, a memory card embedded with a flash memory. The medium control unit 46 records image data compressed by the digital signal processing unit 44 on the recording medium 52.

The setting information storage unit 48 stores setting information including imaging information relating to imaging conditions of the imaging unit. In a case where the setting information is set or changed by an operation of the exposure correction dial 23, the shutter speed dial 24, the ISO sensitivity dial 26, the operation buttons 28, or the touch panel 29, the main control unit 41 stores the setting information in the setting information storage unit 48. The setting information storage unit 48 is constituted of a nonvolatile memory. As the setting information that is stored in the setting information storage unit 48, setting information regarding which of the finder display unit 31 and the rear display unit 14 the live view image is displayed on in a case where the imaging mode is selected is also included.

In a case where the imaging mode is selected, the display control unit 47 reads the imaging information from the setting information storage unit 48 and makes imaging information D be displayed around the display range of the live view image on the finder display unit 31. In the embodiment, in a case where the live view image is displayed in the maximum display range displayable on the finder display unit 31, the live view image is displayed over the entire width of the finder display unit 31. Thus, the imaging information D is displayed in an empty space on an upper or lower side of the finder display unit 31 so as not to interfere with the live view image.

As shown in FIGS. 4 and 5, as the imaging information D that is displayed on the finder display unit 31, a focus mode, a shutter speed, a stop, ISO sensitivity, dynamic range setting, the number of capturable images, and the like are included.

Figure 6:
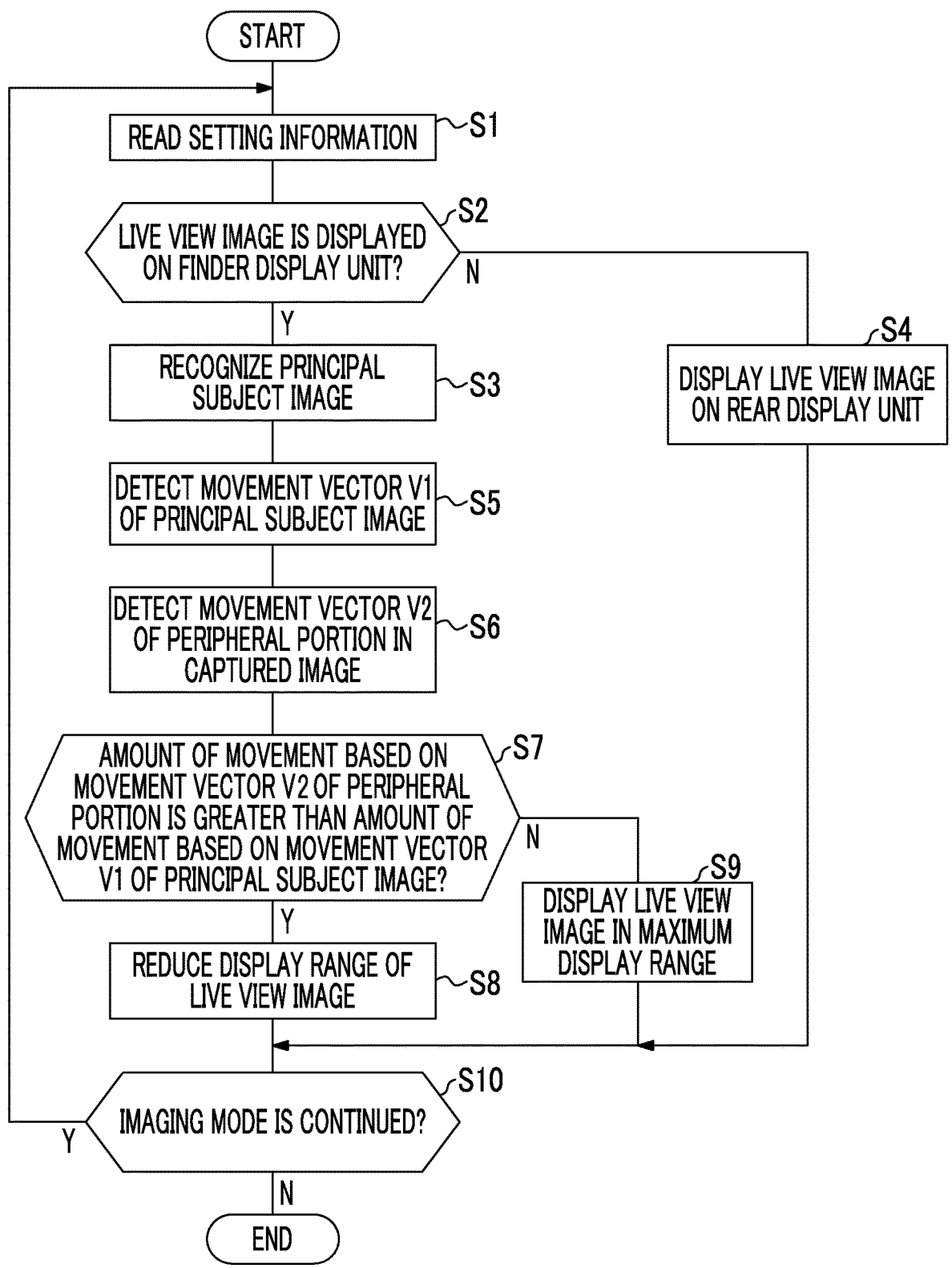
FIG. 6 is a flowchart illustrating processing in displaying a live view image under an imaging mode.

A processing procedure for displaying the live view image under the imaging mode in the digital camera 11 will be described along a flowchart shown in FIG. 6 and an example of a display screen of a live view image shown in FIG. 7.

In a case where the imaging mode is selected in the digital camera 11, the main control unit 41 first reads the setting information including various kinds of imaging information from the setting information storage unit 48 (S1).

The main control unit 41 starts the operation of the imaging unit based on various kinds of read imaging information. In a case where the imaging unit starts the operation, a subject image is incident on the light receiving surface of the imaging element 34 through the imaging optical system 16, and image data is output from the imaging unit. In a case where image data is output from the imaging unit to the digital signal processing unit 44, the main control unit 41 confirms the setting information regarding which of the finder display unit 31 and the rear display unit 14 the live view image is displayed on, and in a case where the live view image is selected to be displayed on the finder display unit 31 (in S2, Y), performs control such that the digital signal processing unit 44 displays the live view image in the display range of the finder display unit 31.

In the example shown in FIG. 7, in a state of the initial setting before the digital signal processing unit 44 functions as the display range change unit, the live view image is displayed in a maximum display range E0 displayable on the finder display unit 31. With this, the photographer provides a sense of presence in the live view image. Then, the digital signal processing unit 44 recognizes the principal subject image from the captured image in the live view image displayed on the finder display unit 31 (S3).

In a case where the live view image is not selected to be displayed on the finder display unit 31 in the setting information (in S2, N), the main control unit 41 performs control such that the display control unit 47 makes the rear display unit 14 display the live view image (S4).

The digital signal processing unit 44 that recognizes the principal subject image M next detects the movement vector V1 of the principal subject image M in the live view image based on the recognized principal subject image M (S5). The digital signal processing unit 44 detects the movement vector V2 of the peripheral portion P in the captured image in the live view image (S6).

In the example shown in FIG. 7, the principal subject image M is moved in the live view image, and a building or the like is moving in the peripheral portion P. That is, the photographer is performing a pan operation, a tilt operation, or the like while gazing the principal subject in order to follow the principal subject. As described above, in the state of the initial setting, since the live view image is displayed in the maximum display range E0 displayable on the finder display unit 31, the outside of the viewing angle, at which the photographer can gaze, that is, the peripheral portion P is apt to be overlooked.

The digital signal processing unit that detects the movement vector V1 of the principal subject image M and the movement vector V2 of the peripheral portion P in the live view image next compares the amount of movement based on the movement vector V2 of the peripheral portion P with the amount of movement based on the movement vector V1 of the principal subject image M (S7). Then, in a case where the amount of movement based on the movement vector V2 of the peripheral portion P is greater than the amount of movement based on the movement vector V1 of the principal subject image M (in S7, Y), control is performed such that the display control unit 47 reduces a display range E1 of the live view image on the finder display unit 31 (S8). In the example shown in FIG. 7, the live view image is displayed in the display range E1 obtained by reducing longitudinal and lateral dimensions at a given reduction rate, for example, 80% with respect to the maximum display range E0 displayable on the finder display unit 31.

On the other hand, in a case where the amount of movement based on the movement vector V2 of the peripheral portion P is equal to or less than the amount of movement based on the movement vector V1 of the principal subject image M (in S8, N), the display range E1 of the live view image on the finder display unit 31 is not changed, and the live view image is displayed in the maximum display range E0 displayable on the finder display unit 31 (S9).

In a case of continuing the imaging mode (in S10, Y), the process returns to S1, and the display of the live view image, the detection of the movement vectors, the change of the display range E1, and the like are repeated. The photographer adjusts an imaging direction or an angle of view while viewing the live view image such that a desired composition is obtained and performs a release operation when the desired composition is obtained. In a case of not continuing the imaging mode (in S10, N), the operation mode of the digital camera 11 is changed or a power source is brought into an off state, and imaging ends.

As described above, in a case where the amount of movement based on the movement vector V2 of the peripheral portion P is greater than the amount of movement based on the movement vector V1 of the principal subject image M, the display range E1 is reduced. Thus, even though the photographer gazes the principal subject, it is possible to allow the photographer to notice movement in the peripheral portion within the live view image. Before the display range E1 is reduced, or the like, the live view image is displayed in the maximum display range E0, and it is possible to obtain the live view image with a sense of presence.

Second Embodiment

In a second embodiment described below, in a case where the amount of movement based on the movement vector of the peripheral portion in the captured image is greater than the amount of movement based on the movement vector of the principal subject image, the display range of the live view image on the finder display unit is reduced, and the imaging information is displayed on the finder display unit on a magnified scale.

As shown in FIG. 8, in the state of the initial setting, the display control unit 47 makes the imaging information D relating to the imaging conditions of the imaging unit be displayed around the maximum display range E0 on the finder display unit 31. In this case, as in the above-described first embodiment, since the live view image is displayed over the entire width of the finder display unit 31, the imaging information D is displayed in an empty space on the upper side or the lower side of the finder display unit 31 so as not to interfere with the live view image.

Then, in a case where the digital signal processing unit 44 as the display range change unit reduces the display range E1 of the live view image, the display control unit 47 makes the imaging information D be displayed on a magnified scale compared to before the reduction of the display range E1. In this case, in the finder display unit 31, since a space on each of the upper side and the lower side of the display range E1 is expanded, and a space occurs on a right side and a left side, the imaging information D is displayed on a magnified scale using the space on each of the upper side, the lower sides, the right side, and the left side of the display range E1.

A flow of processing from the start of the imaging mode until the display range E1 of the live view image is reduced is the same as in the above-described first embodiment. Similarly, the display range E1 is reduced at the given reduction rate with respect to the maximum display range E0.

Third Embodiment

Figure 9:
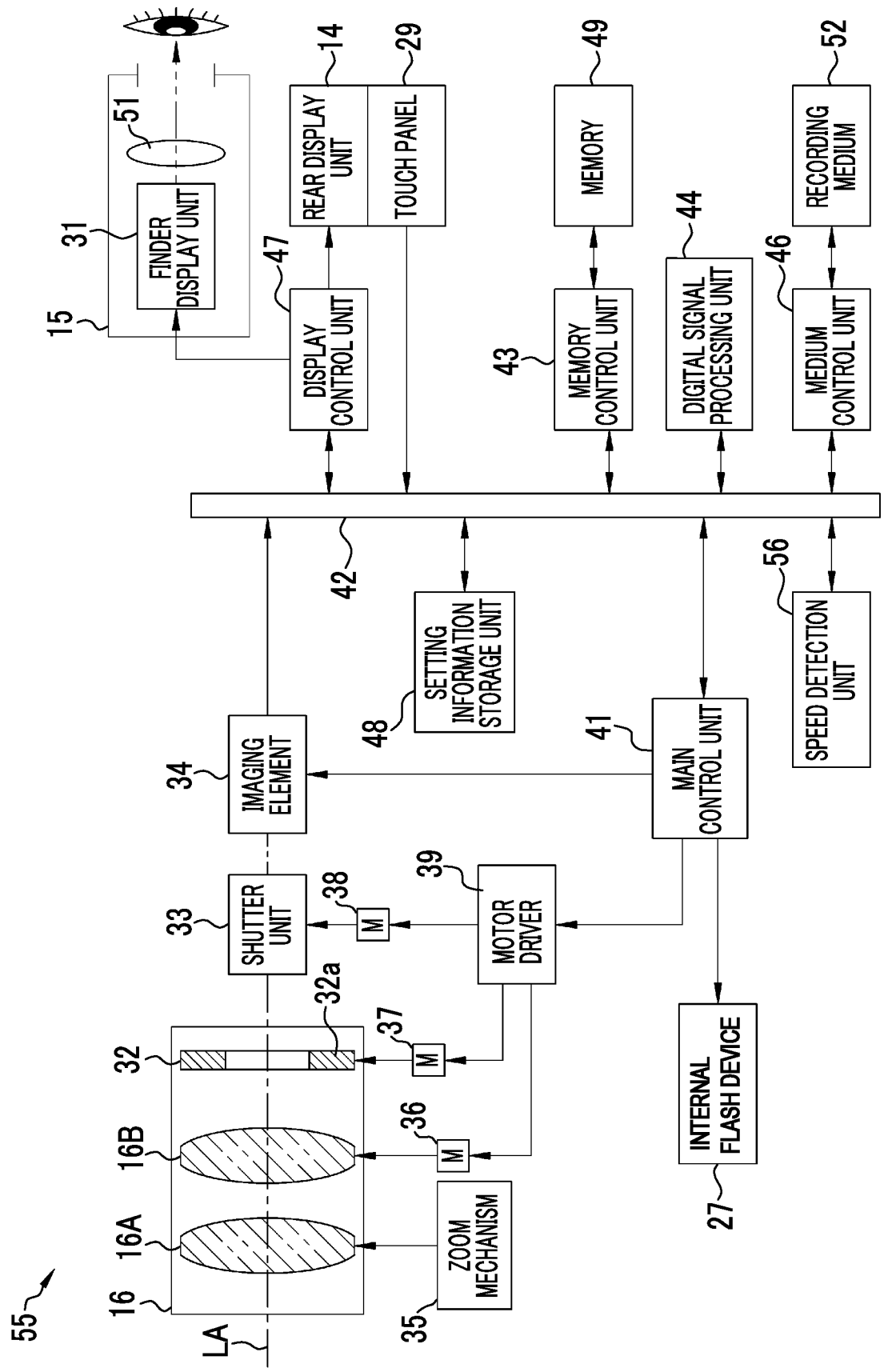
FIG. 9 is a block diagram showing the configuration of a digital camera in a third embodiment.

In the respective embodiments described above, although an example where, in a case where the amount of movement based on the movement vector of the peripheral portion in the captured image is greater than the amount of movement based on the movement vector of the principal subject image, the display range of the live view image on the finder display unit is reduced at a given reduction rate has been described, the invention is not limited thereto. In a third embodiment described below, a speed of a pan operation or a tilt operation is detected, and the reduction rate of the display range is changed according to the detected speed of the pan operation or the tilt operation. In this case, as shown in FIG. 9, a digital camera 55 comprises a speed detection unit 56. The configurations other than the speed detection unit 56 are the same as those in the respective embodiments described above.

The speed detection unit 56 is constituted of a general acceleration sensor, an angular velocity sensor, or the like, and is fixed to the camera body 12 or the lens barrel 13. The invention is not limited thereto, and any unit may be applied as long as the unit can detect the speed of the pan operation or the tilt operation of the digital camera 55.

Figure 10:
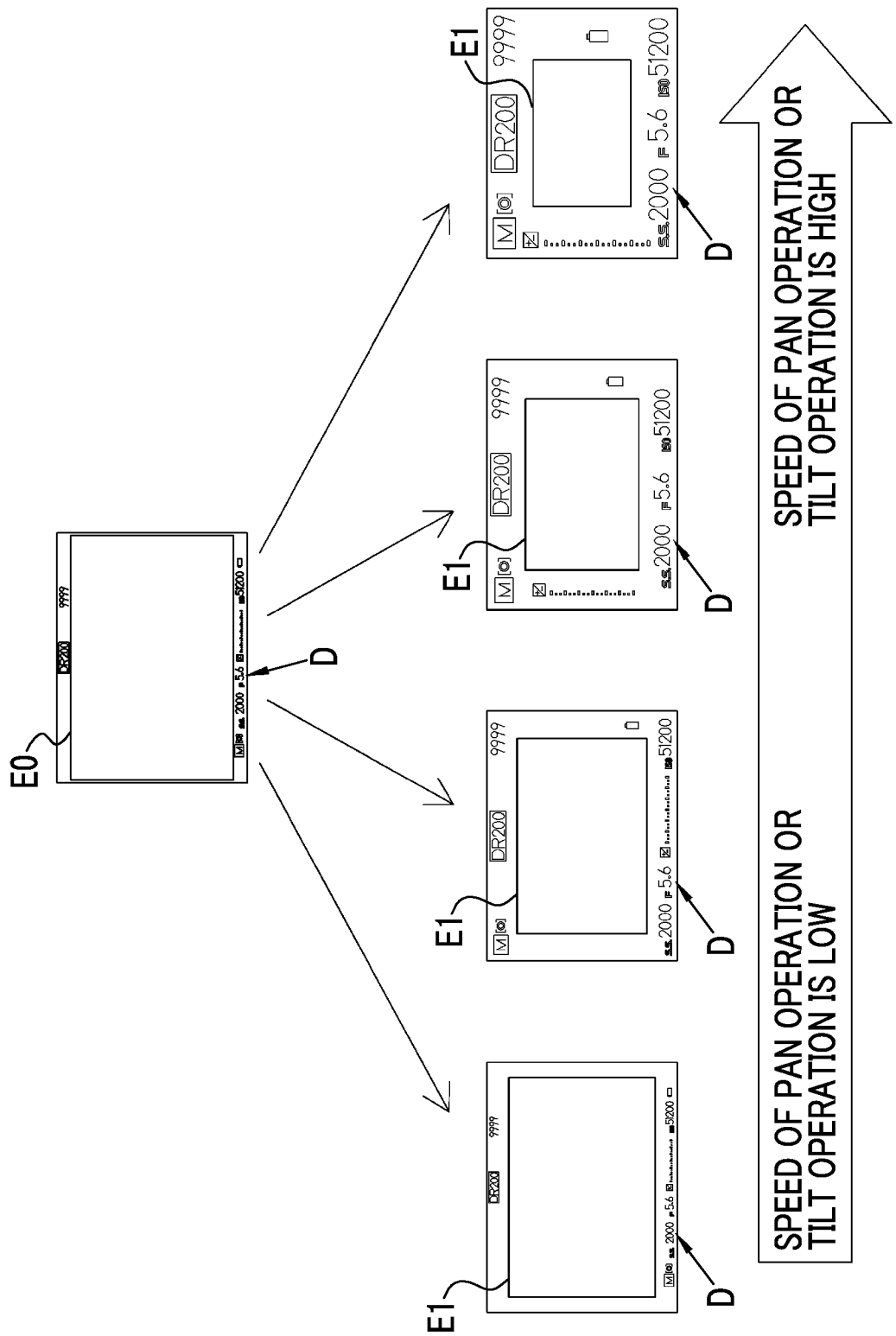
FIG. 10 is an explanatory view showing an example of changing a reduction rate of the display range according to a speed of a pan operation or a tilt operation.

As shown in FIG. 10, the digital signal processing unit 44 changes the reduction rate of the display range E1 with respect to the maximum display range E0 according to the speed detected by the speed detection unit 56. Specifically, the reduction rate of the display range E1 with respect to the maximum display range E0 decreases to, for example, 90%, 80%, 70%, and 60% in a stepwise manner in inverse proportion to the detected speed of the pan operation or the tilt operation.

In a case where the digital camera 55 displays the live view image on the finder display unit 31, as in the above-described embodiments, the amount of movement based on the movement vector V2 of the peripheral portion P is compared with the amount of movement based on the movement vector V1 of the principal subject image M. Then, in a case where the amount of movement based on the movement vector V2 of the peripheral portion P is greater than the amount of movement based on the movement vector V1 of the principal subject image M, control is performed that the display control unit 47 reduces the display range E1 of the live view image on the finder display unit 31. In this way, in reducing the display range E1, the display range E1 is reduced at the reduction rate in inverse proportion to the speed of the pan operation or the tilt operation described above.

When the photographer performs the pan operation or the tilt operation on the digital camera 55 in order to follow the principal subject, the photographer gazes centering on the principal subject. Accordingly, the viewing angle is narrowed, and a range in which the photographer can gaze is more narrowed as the speed of the pan operation or the tilt operation is higher. In the embodiment, since the display range E1 is reduced at the reduction rate in inverse proportion to the speed of the pan operation or the tilt operation, even though a range in which the photographer can gaze is narrowed, it is possible to allow the photographer to notice movement in the peripheral portion P within the live view image.

In the third embodiment, although the reduction rate of the display range is changed according to the speed of the pan operation or the tilt operation, the invention is not limited thereto, and the reduction rate of the display range may be changed according to the angle of view of the imaging optical system 16. In this case, for example, the digital camera comprises a position detection unit that detects a position of the variable magnification lens 16A is provided, and the digital signal processing unit 44 changes the reduction rate of the display range E1 with respect to the maximum display range E0 according to the angle of view of the imaging optical system 16 based on the position of the variable magnification lens 16A detected by the position detection unit. With this, the angle of view of the imaging optical system 16 becomes small (the focal length is extended), and even though the range in which the photographer can gaze is narrowed, it is possible to allow the photographer to notice movement in the peripheral portion within the live view image.

Even in the third embodiment, in a case where the amount of movement based on the movement vector of the peripheral portion in the captured image is greater than the amount of movement based on the movement vector of the principal subject image M, as in the second embodiment, the display range E1 of the live view image on the finder display unit 31 may be reduced, and the imaging information D may be displayed on the finder display unit 31 on a magnified scale. In this case, in a case where the reduction rate of the display range E1 is changed according to the speed of the pan operation or the tilt operation or the angle of view of the imaging optical system 16, a magnification rate of the imaging information D is changed according to the speed of the pan operation or the tilt operation or the angle of view of the imaging optical system 16. In the example shown in FIG. 10, the imaging information D is displayed to be larger in a stepwise manner in proportion to the detected speed of the pan operation or the tilt operation.

Fourth Embodiment

In the respective embodiments described above, although an example where the amount of movement based on the movement vector of the peripheral portion in the captured image is compared with the amount of movement based on the movement vector of the principal subject image, and the display range of the live view image on the finder display unit is a reduced according to the result of comparison has been described, the invention is not limited thereto. In a fourth embodiment described below, in a case where the amount of movement based on the movement vector of the peripheral portion in the captured image is equal to or greater than a predetermined value, the display range of the live view image is reduced regardless of the movement vector of the principal subject image. In this case, in a case of functioning as the movement vector detection unit, the digital signal processing unit 44 detects only the movement vector of the peripheral portion in the captured image.

The digital signal processing unit 44 also functions as a display range change unit that changes the display range of the live view image on the finder display unit 31 based on the movement vector of the peripheral portion P detected in a case of functioning as the movement vector detection unit. In the embodiment, in a case where the amount of movement based on the movement vector V2 of the peripheral portion P is equal to or greater than the predetermined value, the digital signal processing unit 44 performs control such that the display control unit 47 reduces the display range of the live view image on the finder display unit 31. The configurations excluding the digital signal processing unit 44 functioning as the movement vector detection unit and the display range change unit are the same as those in the digital camera 11 of the above-described first embodiment.

Figure 11:
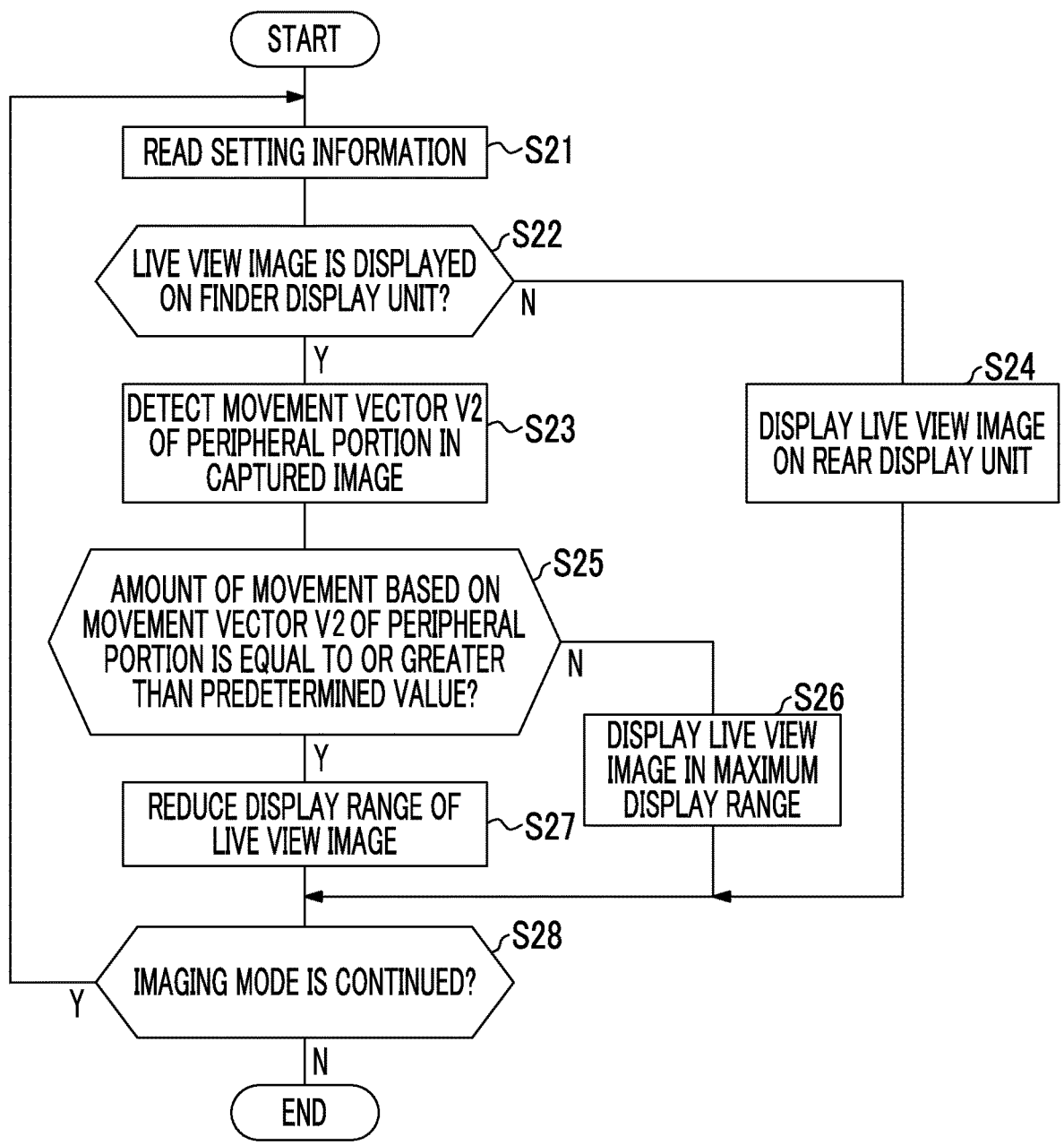
FIG. 11 is a flowchart illustrating processing in displaying a live view image under an imaging mode in a fourth embodiment.

A processing procedure for displaying a live view image under the imaging mode in the digital camera, to which the embodiment is applied, will be described along a flowchart shown in FIG. 11 and an example of a display screen of a live view image shown in FIG. 12.

Under the imaging mode of the digital camera of the embodiment, the main control unit 41 first reads the setting information including various kinds of imaging information from the setting information storage unit 48 (S21).

The main control unit 41 starts the operation of the imaging unit based on various kinds of read imaging information. In a case where the imaging unit starts the operation, a subject image is incident on the light receiving surface of the imaging element 34 through the imaging optical system 16, and image data is output from the imaging unit. In a case where image data is output from the imaging unit to the digital signal processing unit 44, the main control unit 41 confirms the setting information regarding which of the finder display unit 31 and the rear display unit 14 the live view image is displayed on, and in a case where the live view image is selected to be displayed on the finder display unit 31 (in S22, Y), performs control such that the digital signal processing unit 44 displays the live view image in the display range of the finder display unit 31.

In the example shown in FIG. 12, in a state of the initial setting before the digital signal processing unit 44 functions as the display range change unit, the live view image is displayed in a maximum display range E0 displayable on the finder display unit 31. Then, the digital signal processing unit 44 detects the movement vector V2 of the peripheral portion P in the captured image in the live view image (S23).

In a case where the live view image is not selected to be displayed on the finder display unit 31 in the setting information (in S22, N), the main control unit 41 performs control such that the display control unit 47 makes the rear display unit 14 display the live view image (S24).

In the example shown in FIG. 12, the principal subject image M is moved in the live view image, and a building or the like is moving in the peripheral portion P. That is, the photographer is performing a pan operation, a tilt operation, or the like while gazing the principal subject in order to follow the principal subject. In the example shown in FIG. 12, a flying helicopter is exemplified as the principal subject image M and is moving while a blade portion is rotated at a high speed, and in a case where the movement vector of the principal subject image M is detected, and the amount of movement is likely to be a large value.

The digital signal processing unit that detects the movement vector V2 of the peripheral portion P in the live view image next compares the amount of movement based on the movement vector V2 of the peripheral portion P with the predetermined value (S5). Then, in a case where the amount of movement based on the movement vector V2 of the peripheral portion P is equal to or greater than a predetermined value (in S25, Y), control is performed such that the display control unit 47 reduces the display range E1 of the live view image on the finder display unit 31 (S26). In the example shown in FIG. 12, the live view image is displayed in the display range E1 obtained by reducing the longitudinal and lateral dimensions at a given reduction rate, for example, 80% with respect to the maximum display range E0 displayable on the finder display unit 31.

On the other hand, in a case where the amount of movement based on the movement vector V2 of the peripheral portion P is less than the predetermined value (in S25, N), the display range of the live view image on the finder display unit 31 is not changed, and the live view image is displayed in the maximum display range displayable on the finder display unit 31 (S27).

In a case of continuing the imaging mode (in S28, Y), the process returns to S21, and the display of the live view image, the detection of the movement vector, the change of the display range, and the like are repeated. The photographer adjusts an imaging direction or an angle of view while viewing the live view image such that a desired composition is obtained and performs a release operation when the desired composition is obtained. In a case of not continuing the imaging mode (in S28, N), the operation mode of the digital camera is changed or the power source is brought into the off state, and imaging ends.

As described above, in a case where the amount of movement based on the movement vector V2 of the peripheral portion P is equal to or greater than a predetermined value, the display range E1 is reduced. Thus, even though the photographer gazes the principal subject, it is possible to allow the photographer to notice movement in the peripheral portion within the live view image. Before the display range of the live view image on the finder display unit 31 is reduced, or the like, the live view image is displayed in the maximum display range E0, and it is possible to obtain the live view image with a sense of presence.

In the configuration of the above-described first embodiment, the amount of movement based on the movement vector of the principal subject image M is compared with the amount of movement based on the movement vector of the peripheral portion P, and the display range E1 is reduced according to the result of comparison. Thus, as in the example shown in FIG. 12, the amount of movement based on the movement vector of the principal subject image M that moves fast, such as a helicopter, an automobile, or a bird, is greater than the amount of movement based on the movement vector of the peripheral portion P. Therefore, even though there is movement in the peripheral portion P, the display range E1 may not be reduced. In contrast, in the embodiment, since only the amount of movement based on the movement vector of the peripheral portion P is compared with the predetermined value, it is possible to allow the photographer to notice movement in the peripheral portion within the live view image.

Even in the fourth embodiment, in a case where the amount of movement based on the movement vector V2 of the peripheral portion P is equal to or greater than a predetermined value, as in the second embodiment, the display range E1 of the live view image on the finder display unit 31 may be reduced, and the imaging information D may be displayed on the finder display unit 31 on a magnified scale. Alternatively, as in the third embodiment, the reduction rate of the display range may be changed according to the speed of the pan operation or the tilt operation or the angle of view of the imaging optical system 16.

Fifth Embodiment

Figure 13:
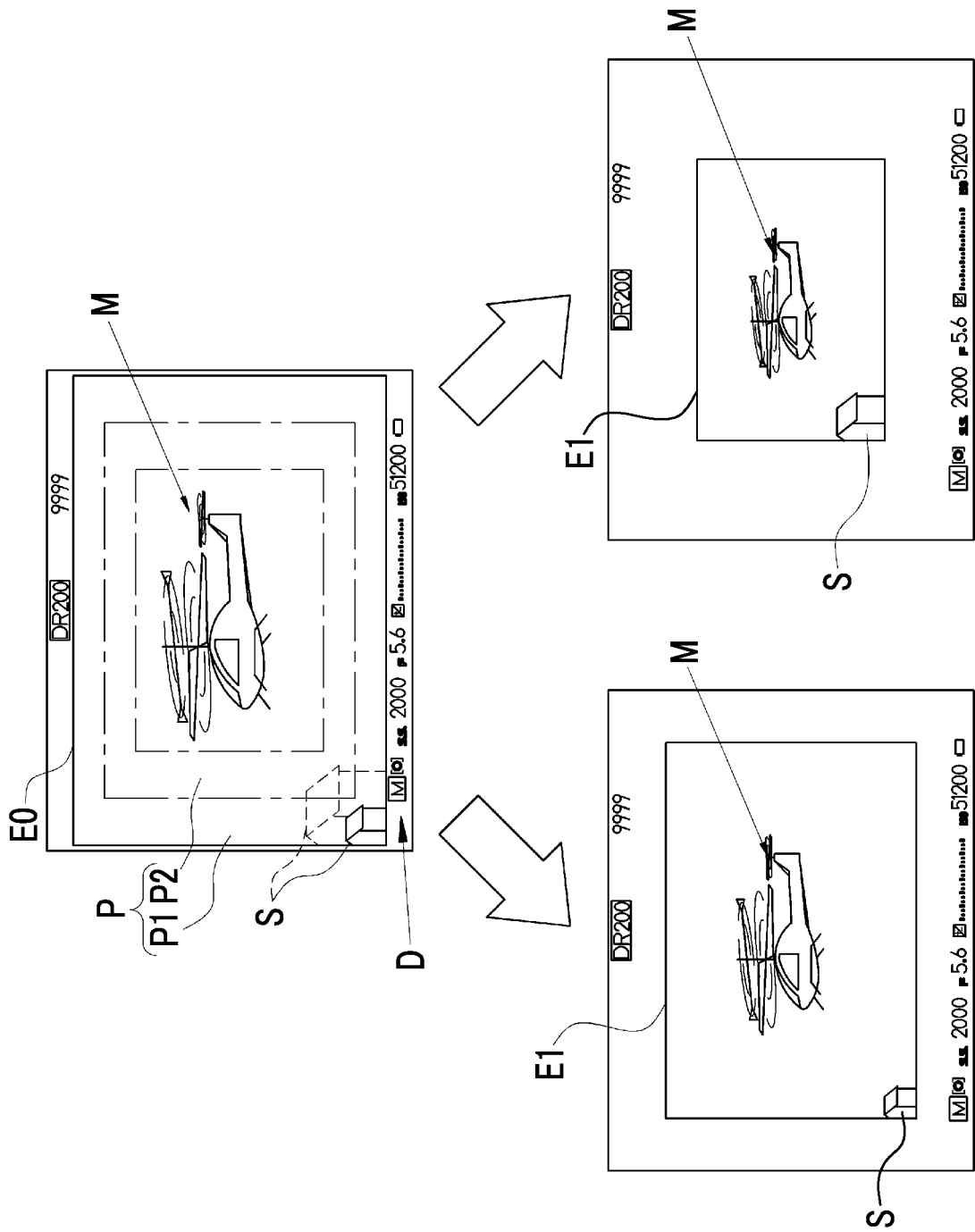
FIG. 13 is an example of the display screen of the live view image in a fifth embodiment, in which a reduction rate is changed according to a portion where a movement vector is detected, and is an explanatory view showing before and after change in a case of reducing the display range of the live view image.

In the above-described fourth embodiment, although an example where, in a case where the amount of movement based on the movement vector of the peripheral portion P is equal to or greater than a predetermined value, the display range of the live view image on the finder display unit is reduced at the given reduction rate has been described, the invention is not limited. In a fifth embodiment described below, the reduction rate is changed according to a portion, in which the movement vector is detected, in the peripheral portion P within the captured image in the live view image displayed on the finder display unit 31. In this case, for example, as shown in FIG. 13, the peripheral portion P is divided into two portions P1 and P2 of an outside and an inside (in the following description, referred to as an outer peripheral portion P1 and an inner peripheral portion P2, respectively). Then, the reduction rate is changed in a case where a portion S in the peripheral portion P where the movement vector is detected is present only in the outer peripheral portion P1 and in a case where the portion S is present in the inner peripheral portion P2.

In a case where the portion S (a position indicated by a solid line) where the movement vector is detected is present only in the outer peripheral portion P1, the digital signal processing unit 44 sets the reduction rate of the display range E1 with respect to the maximum display range E0 to, for example, 80%. On the other hand, in a case where the portion S (a position indicated by a broken line) where the movement vector is detected is present in the inner peripheral portion P2, the digital signal processing unit 44 sets the reduction rate of the display range E1 with respect to the maximum display range E0 to be smaller, for example, 60%.

When the photographer performs the pan operation or the tilt operation on the digital camera in order to follow the principal subject, the photographer gazes centering on the principal subject. Thus, the viewing angle is narrowed, and in a case where the portion S where the movement vector is detected is present not only in the outer peripheral portion P1 but also in the inner peripheral portion P2, it is considered that the range in which the photographer can gaze is narrowed. In the embodiment, in a case where the portion S (the position indicated by the broken line) where the movement vector is detected is present in the inner peripheral portion P2, the reduction rate of the display range E1 with respect to the maximum display range E0 is smaller. Thus, even though the range in which the photographer can gaze is narrowed, it is possible to allow the photographer to notice movement in the peripheral portion within the live view image.

In the example shown in FIG. 13, although an example where the peripheral portion P is divided into the two portions, and the reduction rate of the display range E1 with respect to the maximum display range E0 is changed in the two steps according to the portion S where the movement vector is detected has been described, the invention is not limited thereto. The peripheral portion may be divided into three or more portions, and the number of steps in which the reduction rate of the display range E1 with respect to the maximum display range E0 may be changed may be increased according to the number of divided portions.

Figure 14:
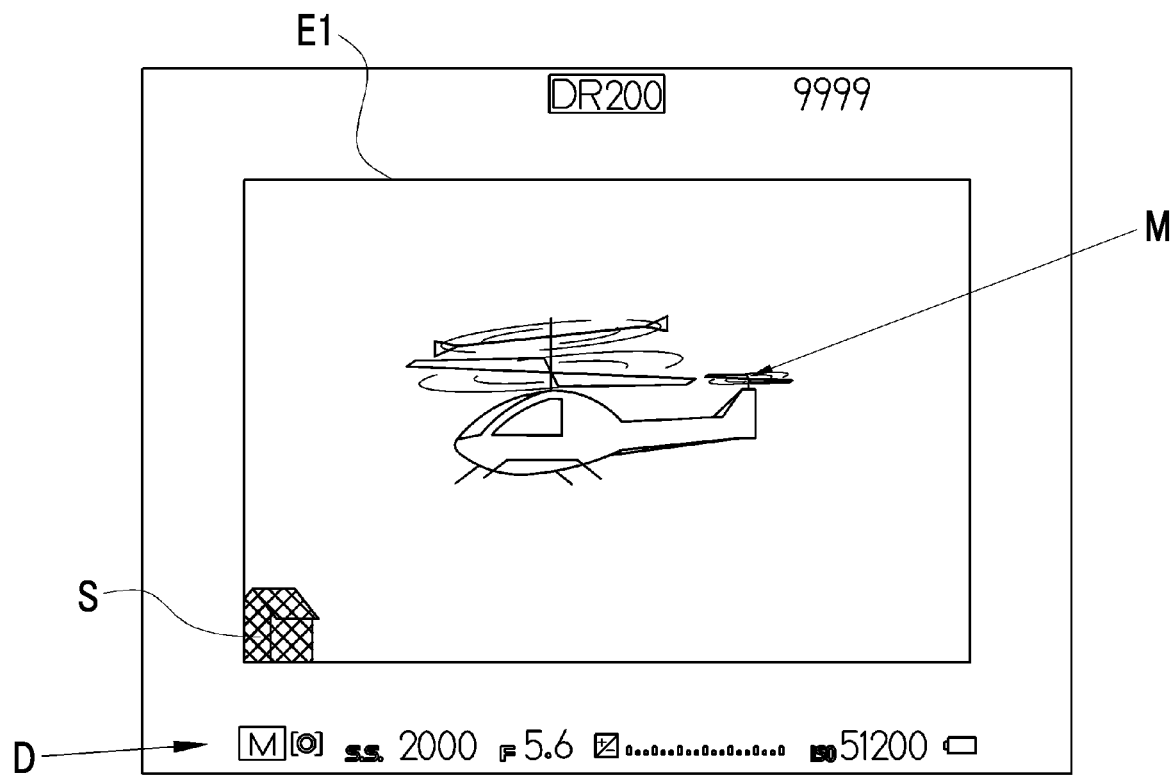
FIG. 14 is an example of the display screen of the live view image, on which a portion where a movement vector is detected, is displayed in a meshed manner.
Figure 15:
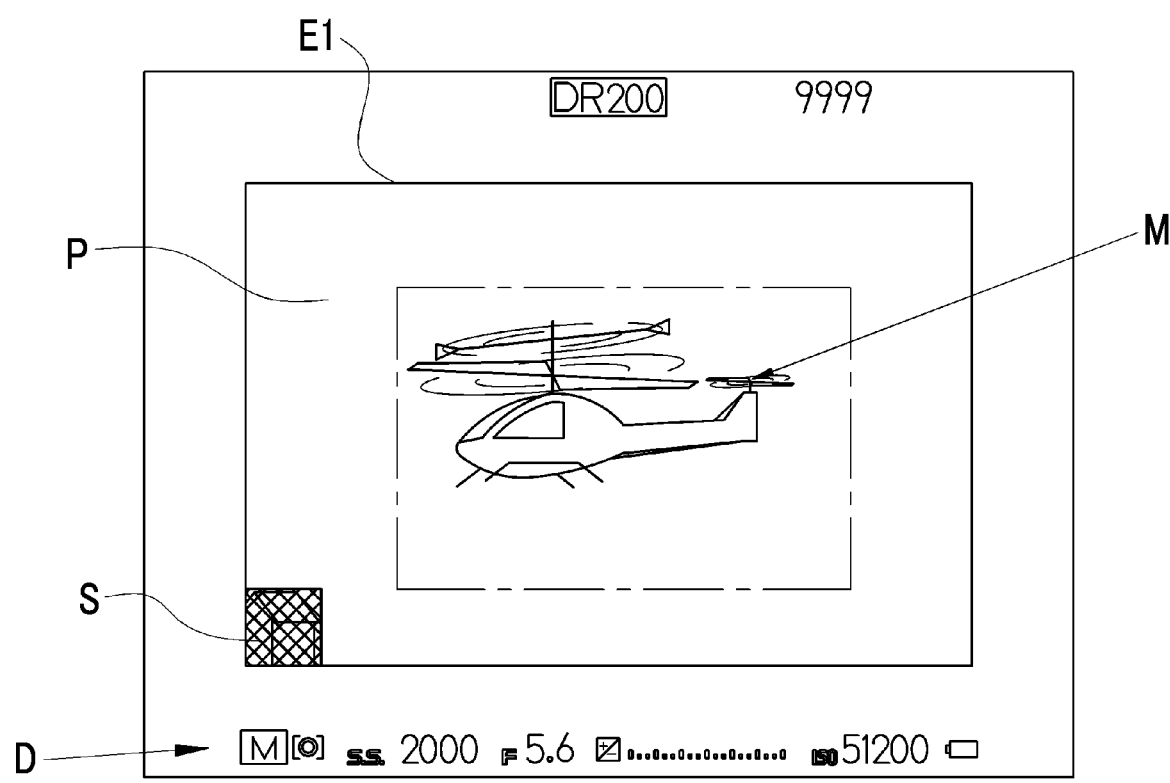
FIG. 15 is an example of the display screen of the live view image on which the portion where the movement vector is detected is displayed in a meshed manner in a block unit.

In order to allow the photographer to easily notice the portion S where the movement vector is detected, as shown in FIGS. 14 and 15, the portion S where the movement vector is detected may be displayed to be different from a portion therearound, for example, in a meshed manner. FIG. 14 shows a case where only the portion where the movement vector is detected is displayed in a meshed manner, and FIG. 15 shows a case where the peripheral portion P is divided into rectangular blocks, and a block where the movement vector is detected is displayed in a meshed manner. The display of the portion S where the movement vector is detected is not limited thereto, and the portion S where the movement vector is detected may be displayed to be different from a portion therearound, such as inverting colors or blinking.

In the respective embodiments described above, although the digital signal processing unit 44 detects the movement vector between the frames in the live view image in a case of functioning as the movement vector detection unit, the invention is not limited thereto, and the movement vector between the frames in the captured images generated cyclically from the imaging unit may be detected. In this case, as in the respective embodiments described above, the display range of the live view image on the finder display unit is changed based on the movement vector detected from the captured images.

In the respective embodiments described above, the imaging element 34 is a CMOS type image sensor, but may be a CCD type image sensor. In the respective embodiments described above, the finder unit is an electronic view finder, but may be a hybrid view finder. In the respective embodiments described above, although the internal flash device is used, an external flash device may be used.

The invention can be applied to an imaging apparatus, such as a smartphone or a video camera, in addition to the digital camera.

EXPLANATION OF REFERENCES

11: digital camera
12: camera body
13: lens barrel
14: rear display unit
15: finder unit
15A: finder eyepiece window
16: imaging optical system
16A: variable magnification lens
16B: focus lens
17: focus ring
18: stop ring
19: zoom ring
21: power lever
22: release switch 23: exposure correction dial
24: shutter speed dial
26: sensitivity dial
27: internal flash device
28: operation button
29: touch panel
31: finder display unit
32: stop unit
32a: stop leaf blade
33: shutter unit
34: imaging element
35: zoom mechanism
36, 37, 38: motor
39: motor driver
41: main control unit
42: bus
43: memory control unit
44: digital signal processing unit
46: medium control unit
47: display control unit
48: setting information storage unit
49: memory
51: eyepiece optical system
52: recording medium
55: digital camera
56: speed detection unit

What is claimed is:

1. An imaging apparatus comprising:
an imager that images a subject to generate a captured image;
a finder display that displays a live view image based on the captured image generated by the imager; and
a processor configured to perform:
a movement vector detection function that detects a movement vector between frames in the captured image or the live view image for a predetermined portion in the captured image; and
a display range change function that changes a display range of the live view image on the finder display by reducing or enlarging longitudinal and lateral dimensions of the display range based on the movement vector of a peripheral portion in the captured image detected by the movement vector detection function.

2. The imaging apparatus according to claim 1,
wherein the processor further configured to perform:
a principal subject image recognition function that recognizes a principal subject image present in the captured image,
wherein the movement vector detection function detects the movement vector of the principal subject image in a case where the principal subject image is recognized by the principal subject image recognition function, and
the display range change function compares an amount of movement based on the movement vector of the peripheral portion with an amount of movement based on the movement vector of the principal subject image and reduces the display range in a case where the amount of movement based on the movement vector of the peripheral portion is greater than the amount of movement based on the movement vector of the principal subject image.

3. The imaging apparatus according to claim 2,
wherein the processor further configured to perform:
a speed detection function that detects a speed of a pan operation or a tilt operation,
wherein the display range change function changes a reduction rate of the display range according to the speed detected by the speed detection function.

4. The imaging apparatus according to claim 2,
wherein the processor further configured to perform:
a display control function that makes imaging information relating to an imaging content of the imager be displayed around the display range on the finder display,
wherein, in a case where the display range change function reduces the display range, the display control function makes the imaging information be displayed on a magnified scale compared to before the reduction of the display range.

5. The imaging apparatus according to claim 4,
wherein the processor further configured to perform:
a speed detection function that detects a speed of a pan operation or a tilt operation,
wherein the display range change function changes a reduction rate of the display range according to the speed detected by the speed detection function, and
the display control function changes a magnification rate of the imaging information according to the speed.

6. The imaging apparatus according to claim 2,
wherein the imager comprises an optical system that is able to change an angle of view, and
the display range change function changes a reduction rate of the display range according to the angle of view.

7. The imaging apparatus according to claim 1,
wherein the display range change function reduces the display range in a case where an amount of movement based on the movement vector of the peripheral portion is equal to or greater than a predetermined value.

8. The imaging apparatus according to claim 7,
wherein a reduction rate of the display range is changed according to a portion in the peripheral portion where the movement vector is detected.

9. A control method for an imaging apparatus comprising an imager that images a subject to generate a captured image, and a finder display that displays a live view image based on the captured image generated by the imager, the control method comprising:
a step of detecting a movement vector between frames in the captured image or the live view image for a peripheral portion in the captured image; and
a step of changing a display range of the live view image on the finder display by reducing or enlarging longitudinal and lateral dimensions of the display range based on the movement vector of the peripheral portion detected by the movement vector detection.

10. A non-transitory computer readable medium for storing a computer-executable program for an imaging apparatus comprising an imager that images a subject to generate a captured image, and a finder display that displays a live view image based on the captured image generated by the imager, the computer-executable program causing a computer to execute:
a step of detecting a movement vector between frames in the captured image or the live view image for a peripheral portion in the captured image; and
a step of changing a display range of the live view image on the finder display by reducing or enlarging longitudinal and lateral dimensions of the display range based on the movement vector of the peripheral portion detected by the movement vector detection.

* * * * *